United States Patent
Cheng et al.

(10) Patent No.: US 9,762,906 B2
(45) Date of Patent: Sep. 12, 2017

(54) METHOD AND APPARATUS FOR VIDEO DECODING USING MULTI-CORE PROCESSOR

(71) Applicant: MEDIATEK INC., Hsin-Chu (TW)

(72) Inventors: Chia-Yun Cheng, Zhubei (TW);
Huei-Min Lin, Zhubei (TW);
Yung-Chang Chang, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 308 days.

(21) Appl. No.: 14/179,540

(22) Filed: Feb. 12, 2014

(65) Prior Publication Data
US 2014/0233649 A1 Aug. 21, 2014

Related U.S. Application Data

(60) Provisional application No. 61/765,982, filed on Feb. 18, 2013.

(51) Int. Cl.
*H04N 19/436* (2014.01)
*H04N 19/82* (2014.01)
*H04N 19/86* (2014.01)
*H04N 19/51* (2014.01)

(52) U.S. Cl.
CPC ..... *H04N 19/00915* (2013.01); *H04N 19/436* (2014.11); *H04N 19/82* (2014.11); *H04N 19/865* (2014.11); *H04N 19/51* (2014.11)

(58) Field of Classification Search
CPC .... H04N 19/915; H04N 19/436; H04N 19/82; H04N 19/865; H04N 19/51
USPC .................................................. 375/240.16
See application file for complete search history.

(56) References Cited

U.S. PATENT DOCUMENTS

| | | | | |
|---|---|---|---|---|
| 2006/0078052 A1* | 4/2006 | Dang | ..................... | H04N 19/86 375/240.24 |
| 2008/0225956 A1* | 9/2008 | Kusakabe | ............ | H04N 19/176 375/240.24 |
| 2012/0257702 A1* | 10/2012 | Narroschke | .......... | H04N 19/176 375/240.29 |
| 2015/0326886 A1* | 11/2015 | Chen | ..................... | H04N 19/61 375/240.02 |

OTHER PUBLICATIONS

Iain E G Richardson, "H.264 / MPEG-4 Part 10 White Paper: Reconstruction Filter", Oct. 17, 2002, https://www.vcodex.com.

* cited by examiner

*Primary Examiner* — William C Vaughn, Jr.
*Assistant Examiner* — Jae N Noh
(74) *Attorney, Agent, or Firm* — McClure, Qualey & Rodack, LLP (57) ABSTRACT

A method and apparatus for deblocking process using multiple processing units are disclosed. The video image is divided into at least two regions. The in-loop filter is applied to block boundaries associated with said at least two regions using multiple processing units. The in-loop filter is re-applied to one or more second block boundaries adjacent to region edge between two regions after applying the in-loop filter to the first block boundaries adjacent to the region edge. Furthermore, at least a first portion of said applying the in-loop filter to the first block boundaries and a second portion of said applying the in-loop filter to the second block boundaries are performed concurrently. The multiple processing units may correspond to multiple processing cores within one processor chip.

11 Claims, 8 Drawing Sheets

METHOD AND APPARATUS FOR VIDEO DECODING USING MULTI-CORE PROCESSOR

CROSS REFERENCE TO RELATED APPLICATIONS

The present invention claims priority U.S. Provisional Patent Application No. 61/765,982, filed on Feb. 18, 2013, entitled "Novel control method of video process". This U.S. Provisional Patent Application is hereby incorporated by reference in its entirety.

FIELD OF THE INVENTION

The present invention relates to video coding. In particular, the present invention relates to in-loop filtering process at block boundaries in video decoding using a dual-core processor.

BACKGROUND AND RELATED ART

Motion compensated transform coding has been widely adopted in various coding standards, where block transform is applied to motion-compensated residues. The motion compensated inter-frame coding system also uses intra-frame mode periodically or adaptively. During the coding process, transform coefficients are quantized in order to reduce bitrate and consequently artifacts are introduced. The artifacts are more visible at boundaries around transform blocks. In order to alleviate the coding artifacts, a technique called deblocking has been developed, which applies in-loop filtering across block boundaries adaptively. The deblocking technique is also called deblocking filter in the field of video coding.

Figure 1:
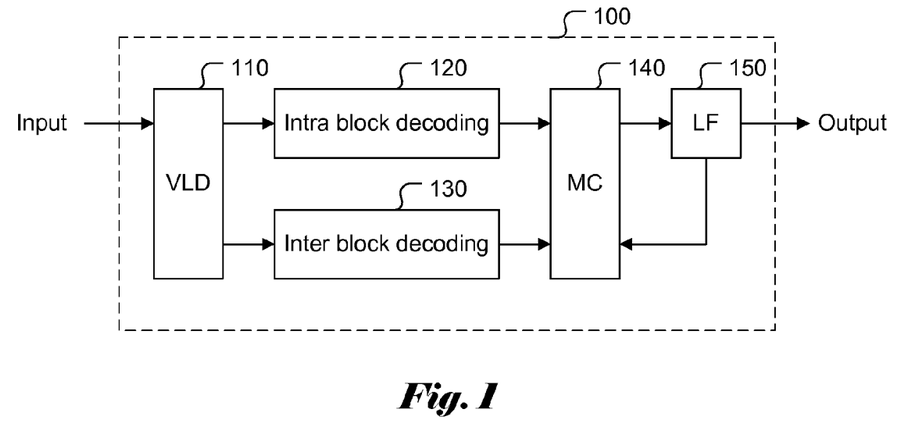
FIG. 1 illustrates an exemplary diagram of video decoding with an in-loop filter.

The H.264 coding standard also adopts block-based motion-compensation, where the deblocking filter is applied to reduce the distortion most visible across block boundaries. FIG. 1 shows an exemplary decoding flow used in H.264. The input coded bitstream provided to decoder 100 is processed by variable length decoding (VLD) 110. The decoded data is then processed by Intra block decoding 120 or Inter block decoding 130 for reconstruction depending on whether the block is Intra-coded or Inter-coded. The reconstructed data is stored and used for motion compensation (MC) 140 by other frames. In order to improve video quality, in-loop filtering (LF) 150 is applied to the reconstructed video. The in-loop filter is applied across boundaries of 4×4 blocks. The horizontal deblocking filter is applied to vertical block boundaries first in the order from left to right and the vertical deblocking filter is then applied to the horizontal boundaries in the order from top to bottom. The deblocked video data is then stored in the frame buffer (not explicitly shown in FIG. 1) and used for motion compensation by other frames.

Figure 2:
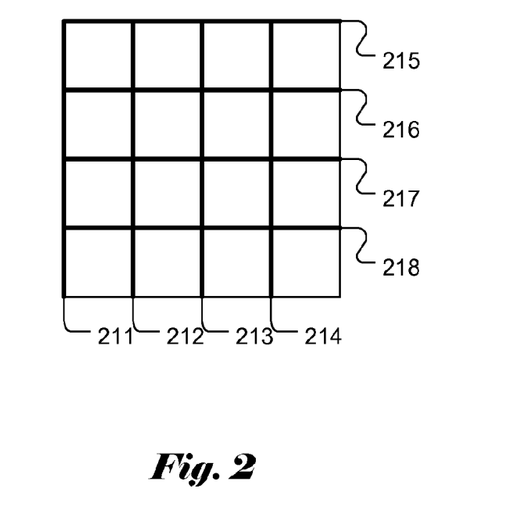
FIG. 2 illustrates an exemplary filter order of the block boundaries of the luma component in a macroblock.
Figure 3:
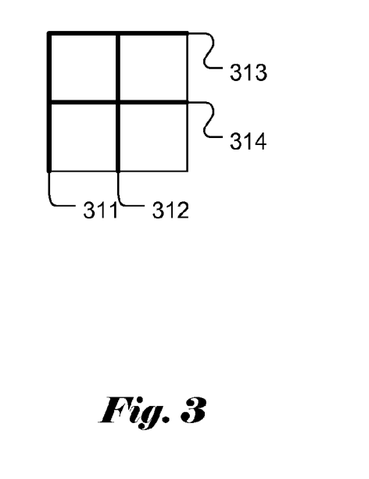
FIG. 3 illustrates an exemplary filter order of the block boundaries of the chroma component in a macroblock.

FIG. 2 illustrates an example of filtering 4×4 block boundaries of the luma component in a macroblock according to the H.264 coding standard. The deblocking operation is applied to vertical boundaries in the order of 211, 212, 213 and 214. The deblocking operation is also applied to horizontal boundaries in the order of 215, 216, 217 and 218. FIG. 3 illustrates an example of filtering block boundaries of a macroblock for the chroma component. Similarly, the deblocking filter processes vertical boundaries in the order of 311 and 312. Horizontal boundaries 313 and 314 are then filtered.

Figure 4A:
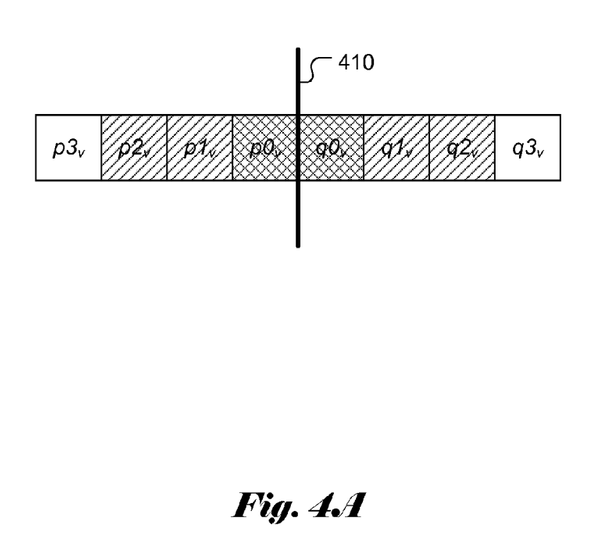
FIG. 4A illustrates an example of boundary pixels and processed pixels on each side of a vertical boundary.

The filtering operation on every block boundary of the luma component updates 0 to 3 pixels on each side of the boundary. FIG. 4A shows an example of filtering a pixel line across a vertical boundary. In the pixel line across the vertical boundary 410, four pixels on each side of the vertical boundary, labeled as ($p3_v$, $p2_v$, $p1_v$, $p0_v$, $q0_v$, $q1_v$, $q2_v$, $q3_v$), respectively are used to derive filter parameters. Pixels immediately next to the block boundary, i.e., p0 and q0, are named the first boundary pixels. Similarly, p1 and q1 are named the second boundary pixels, p2 and q2 are named the third boundary pixels and p3 and q3 are named the fourth boundary pixels. For filtering the vertical boundary of the luma component, the deblocking filter updates at most 3 pixels from the first boundary pixel to the third boundary pixel on each side of the vertical boundary depending on the boundary strength assigned to the vertical boundary. For the chroma component, no pixel or only the first boundary pixel of each side of vertical boundary 410 may be modified by the deblocking process depending on the boundary strength. Therefore, at most 1 pixel on each side of the vertical boundary may be affected by the deblocking operation.

Figure 4B:
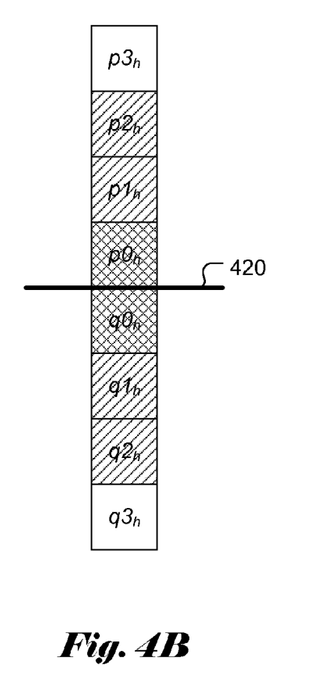
FIG. 4B illustrates an example of boundary pixels and processed pixels on each side of a horizontal boundary.

FIG. 4B shows an example of filtering a pixel line across horizontal boundary 420. Similar to filtering a vertical boundary as shown in FIG. 4A, the deblocking filter may update up to 3 pixels from the first boundary pixel to the third boundary pixel on each side of the horizontal boundary for the luma component. In other words, only pixels $p2_h$, $p1_h$, $p0_h$, $q0_h$, $q1_h$, and $q2_h$ may be modified by the deblocking process for the luma component. For the chroma component, only one pixel on each side of the boundary, i.e., $p0_h$ and $q0_h$ may be updated.

The number of pixels to be updated for deblocking on each side of a block boundary is determined based on the boundary strength. The boundary strength parameter Bs is estimated according to the information of the current macroblock (MB) to be processed. The information used to determine Bs includes the Intra/Inter prediction mode information, the coded block pattern, the motion vector, the pixel values or other information of the MB. The boundary strength parameter Bs(Cx, Cy) for filtering the chroma block boundary can be derived from the boundary strength parameter Bs(Yx, Yy) for filtering block boundaries of the luma component in the same MB. The relationship between (Bs(Cx, Cy) and Bs(Yx, Yy) can be represented by the following three equations:

$$Bs(Cx,Cy)=Bs(Yx,Yy),$$

$$Yx=\text{subwidth}C*Cx, \text{ and}$$

$$Yy=\text{subheight}C*Cy,$$

where Yx and Yy denote the location of the current block boundary of the luma component in x and y directions respectively, and Cx and Cy denote the locations of the current block boundary of the chroma component in x and y directions respectively. The parameters subwidthC and subheightC are used to map the location of the current block boundary of the chroma component to the corresponding location of the current block boundary of the luma component.

Figure 5:
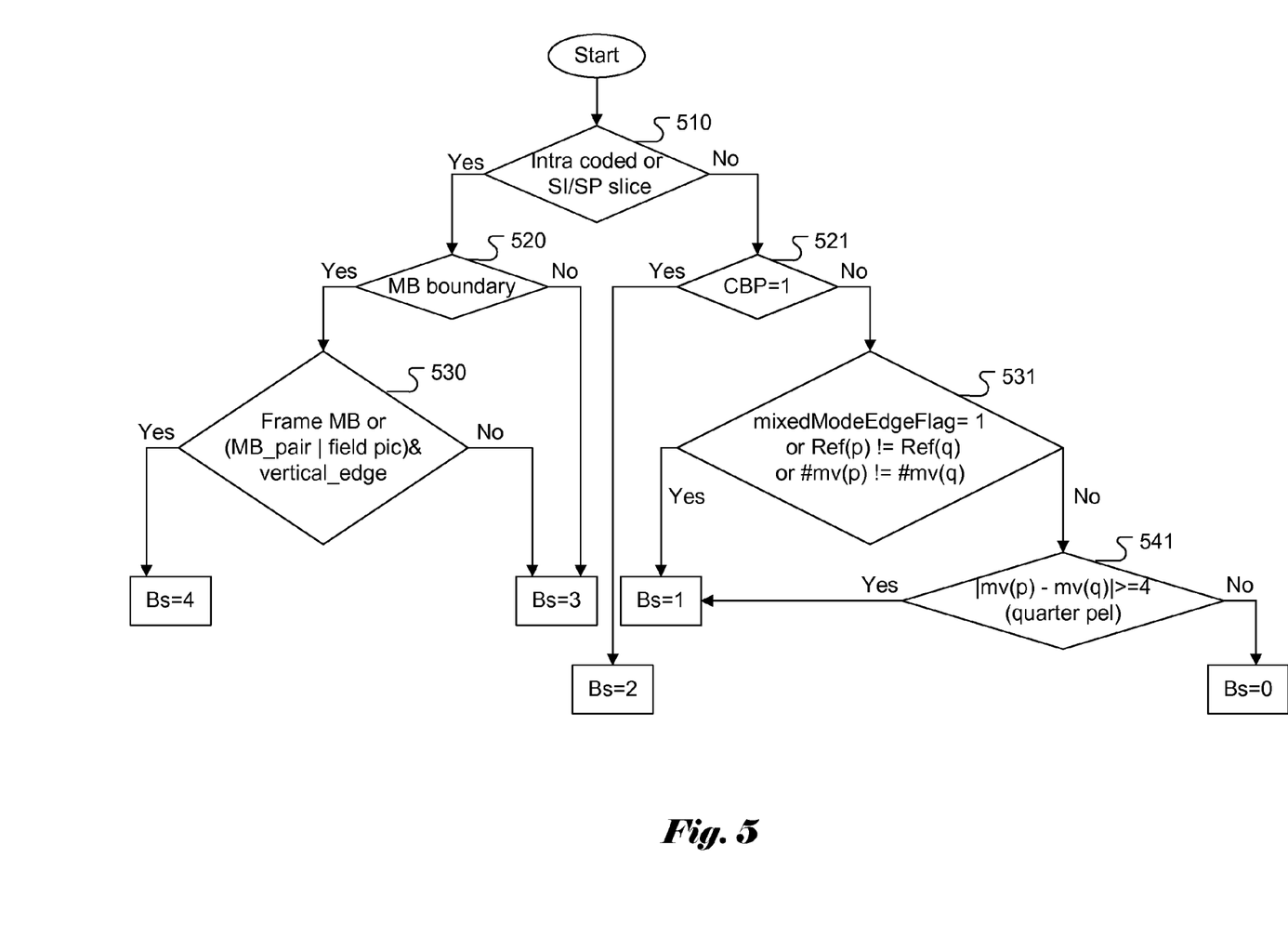
FIG. 5 illustrates an exemplary flow diagram for determining boundary strength parameter (Bs).

FIG. 5 illustrates an exemplary diagram to determine Bs for filtering block boundaries of the luma component according to H.264. For a block boundary to be filtered, a test is performed regarding whether the samples to be filtered belong to an Intra coded MB, a slice of SI (Switching I-Picture) or SP (Switching P-Picture) type as shown in step 510. If the samples to be filtered is in an Intra coded block or a SI/SP slice, step 520 is performed to determine whether the current block boundary is a MB boundary. When the current block boundary to be processed is also a MB boundary, significant blocking distortion may exist in the current block boundary. Step 530 is used further to determine the Bs for the block boundary. In step 530, if any of the following two conditions are met, Bs is set to 4: (1) if the samples to be filtered are in frame macroblocks; or (2) if (the samples are in a macroblock pair or in a field picture), and the samples are associated with a vertical block edge. If neither of the two conditions is met in step 530, the block strength parameter Bs is set to 3. In step 520, when the current block boundary is not a MB boundary, Bs is set to 3.

If the samples to be filtered is not in an Intra coded block or a SI/SP slice, a further test is performed in step 521 to determine whether the Coded Block Pattern (CBP) value is equal to 1 (i.e. CBP=1), which implies at least one of the two adjacent 4×4 blocks on both sides of the current boundary contains coded coefficients. If the Coded Block Pattern value is equal to 1, then Bs is 2. When none of the two adjacent 4×4 blocks contains coded coefficients (i.e. CBP=0), a further test is performed in step 531 to determine the value of Bs. In step 531, if any of the following three conditions is met, Bs is set to 1: (1) the two first boundary pixels belong to different macroblock pairs as indicated by mixedModeEdgeFlag=1; (2) the two adjacent 4×4 blocks on both sides of the current boundary have different reference frames or a different number of reference frames as indicated by Ref(p)!=Ref(q); or (3) the two adjacent 4×4 blocks on both sides of the current boundary have different motion vector values as indicated by #mv(p)!=#mv(q). If none of the above three conditions in step 531 is met, a further test is performed in step 541 to determine the value of Bs. In step 541, if the absolute difference between the respective horizontal or vertical component of the motion vectors for the two adjacent blocks used is greater than or equal to 4 in units of quarter luma frame samples (i.e. |mv(p)−mv(q)|>=4(quarter pel)), Bs is set to 1. Otherwise, Bs is set to 0.

The filter mode for deblocking is selected based on the boundary strength of neighboring blocks and the gradient of samples across the boundary. When the current block boundary to be filtered is a MB boundary, the deblocking filter may update at most 3 pixels on each side of the current block boundary. When the current block to be filtered is not a MB boundary, the deblocking filter will update less than 3 pixels on each side of the current block boundary.

The decoding method with deblocking operation mentioned above is usually implemented using a single processor or core to decode one slice of video image. However, dual-core processors or multi-core processors are becoming the trend in personal computer, note book, tablet or smartphone environments. The dual-core processors or multi-core processors would be helpful to fulfill the needed processing power to decode ultra-high definition (UHD) video bitstream. Each coded picture/image in UHD can be divided into at least two independent slices. It is desirable to use dual-core or multi-core processors to perform parallel decoding of independent slices or other picture units concurrently. However, the deblocking process is configured as an in-loop processing, where the deblocking process of a subsequent adjacent macroblock cannot be performed until a previous macroblock is deblocked. Due to data dependency on adjacent previous macroblock, a current slice cannot be processed until the deblocking process for a previous slice is completed. Accordingly, the data dependency associated with the deblocking process poses as a challenge to decoding based on a dual-core or multi-core processor.

BRIEF SUMMARY OF THE INVENTION

A method is disclosed for deblocking process in a video decoding system comprising a first processing unit and a second processing unit. According to one embodiment of the present invention, the video image comprises at least a first region and a second region. The first region consists of first blocks and the second region consists of second blocks. An in-loop filter is applied to first block boundaries associated with the first blocks of the reconstructed data in the first region using the first processing unit. The in-loop filter is applied to second block boundaries associated with the second blocks of the reconstructed data in the second region using the second processing unit. The in-loop filter is re-applied to the second block boundaries adjacent to the region edge between the first region and the second region after applying the in-loop filter to the first block boundaries adjacent to the region edge. Furthermore, at least a first portion of said applying the in-loop filter to the first block boundaries and a second portion of said applying the in-loop filter to the second block boundaries are performed concurrently. The two processing units may correspond to two processing cores within one processor chip.

One aspect of the embodiment addresses re-applying the in-loop filter to the second block boundaries adjacent to the region edge between the first and the second regions. Either one of the two processing unit can be used to re-apply the in-loop filter to the second block boundaries adjacent to the region edge between the first and the second regions after filtering the first block boundaries adjacent to the region edge. The filtering operation may be re-applied only to the second block boundaries in a coding block unit row or column adjacent to the region edge. Each coding block unit consists of multiple 4×4 sub-blocks. The in-loop filter requires data samples from two sides of each first block boundary or each second block boundary.

An apparatus is disclosed for deblocking process in a video decoding system comprising a first processing unit and a second processing unit. According to one embodiment of the present invention, the apparatus comprises an interface unit, a first processing unit and a second processing unit. The interface unit is configured to obtain reconstructed data associated with the video image. The first processing unit is configured to apply an in-loop filter to first block boundaries associated with first blocks of the reconstructed data in a first region of the video image. The second processing unit is configured to apply the in-loop filter to second block boundaries associated with second blocks of the reconstructed data in a second region of the video image. Furthermore, the first processing unit or the second processing unit is further configured to re-applying the in-loop filter to one or more second block boundaries adjacent to region edge between the first region and the second region. The operation of re-applying the in-loop filter is performed after applying the in-loop filter to the first block boundaries adjacent to the region edge. The first processing unit and the second processing unit are configured to apply the in-loop filter to a first portion of the first block boundaries and a second portion of the second block boundaries concurrently. The first processing unit and the second processing unit may correspond to two processing cores within a processor chip.

DETAILED DESCRIPTION OF THE INVENTION

In the present invention, a decoding system uses two processing units to filter two regions of a video image or frame according to one embodiment. The two regions are named as a first region and a second region. The 4×4 blocks in the first region are named as the first blocks and the boundaries between the first blocks are named as the first block boundaries. Similarly, the 4×4 blocks of the second region are names as the second blocks and the boundaries between the second blocks are named as the second block boundaries.

If the two regions are filtered independently without taking into consideration of data dependency across the region edge, blocking distortion between the two regions will not be filtered. The deblocking process for the second region can be started substantially at the same time as the deblocking process for the first region according to the present invention. The deblocking process for the second region may also be started earlier or later than the deblocking process for the first region according to the present invention to take advantage of the dual processing units. In general, as long as a portion of the first region and a portion of the second region are deblocked concurrently, it reduces the processing time compared to a single processing unit. The data samples not-yet deblocked in the first region adjacent to the region edge between these two regions may be used to filter the second block boundaries in the second region adjacent to the region edge. Errors may be introduced for filtering the second block boundaries adjacent to the region edge between these two regions by using dummy data since the deblocked samples are not yet available for boundary pixels in the first region. After filtering the first block boundaries in the first region, the second block boundaries adjacent to the region edge between these two regions can be deblocked by either one of the two processing units to reduce the possible errors. The yet-to-be filtered boundary samples can be used as the dummy data. However, predefined data may also be used as the dummy data.

According to one embodiment of the present invention, a method of applying in-loop filter (e.g., deblocking filter) to the block boundaries of the video image using a first processing unit and a second processing unit is disclosed. The reconstructed data associated with the video image is obtained from the current processing unit of the system or one or more external devices. The external device may be an external processing unit, another processing unit of the system or a memory device etc. The in-loop filter of the decoder is applied to the first block boundaries associated with the first blocks of the reconstructed data in the first region using the first processing unit. The in-loop filter is also applied to the second block boundaries associated with the second blocks of the reconstructed data in the second region using the second processing unit. After applying the in-loop filter to the first block boundaries adjacent to region edge between the first region and the second region, the in-loop filter is re-applied to the second block boundaries adjacent to the region edge. Furthermore, at least a portion of the first block boundaries and a portion of the second block boundaries are deblocked concurrently according to the present invention. The second block boundaries adjacent to the region edge may correspond to the second block boundaries in the coding block units adjacent to the region edge. Each coding block unit consists of multiple second block boundaries horizontally and vertically. The coding block unit may correspond to the macroblock (MB) used in H.264 or the coding tree block (CTB) used in HEVC, or the image processing unit used in other coding standards.

According to another embodiment of the present invention, the in-loop filter is applied to the second block boundaries from the second block boundaries which can be filtered without using the dummy data. After the in-loop filter is applied to the first block boundaries adjacent to the region edge, the in-loop filter is applied to the second block boundaries adjacent to the region edge. In this embodiment, the in-loop filter may be applied only once to the second block boundaries adjacent to the region edge.

Figure 6:
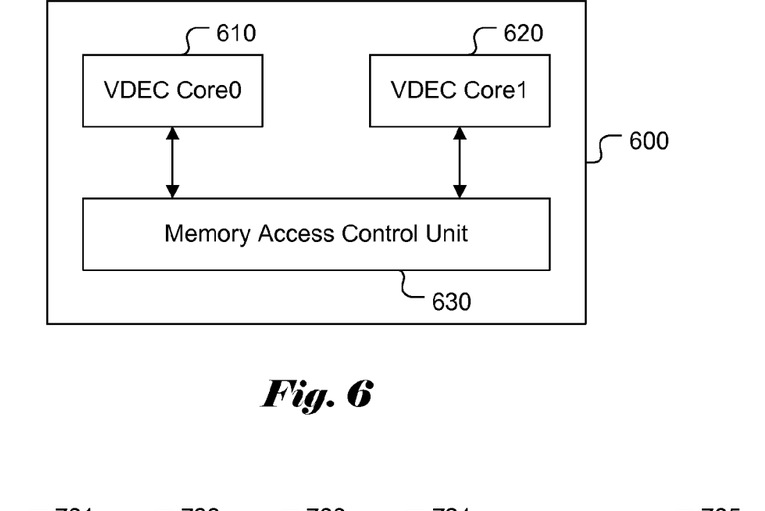
FIG. 6 illustrates an exemplary decoding architecture with a dual-core processor according to the present invention.

FIG. 6 illustrates an exemplary dual-core decoder according to this embodiment. The decoder comprises two processing units which are denoted as VDEC Core0 610 and VDEC Core1 620, respectively. These two processing units may correspond to two cores within one processor chip. Each of these two processing cores is used as a processing unit to decode and filter one of the two adjacent regions in one video image and outputs the filtered result to memory (not shown in FIG. 6) via memory access control unit 630. Each of the two adjacent regions consists of one or more slices and each slice consists of one or more coding block units. Memory access control unit 630 manages the access of filtered results. For example, VDEC Core0 610 is used to perform filtering on the first region of the video image and VDEC Core1 620 is used to perform filtering on the second region. The filtered results of the first block boundaries adjacent to the region edge between these two regions are stored in memory and the filtered results are read back for re-applying the deblocking filter to the second region data adjacent to the region edge. The memory access to the filtered data is managed by memory access control unit 630. The filtered results may also be used for motion compensation by other frames.

Figure 7:
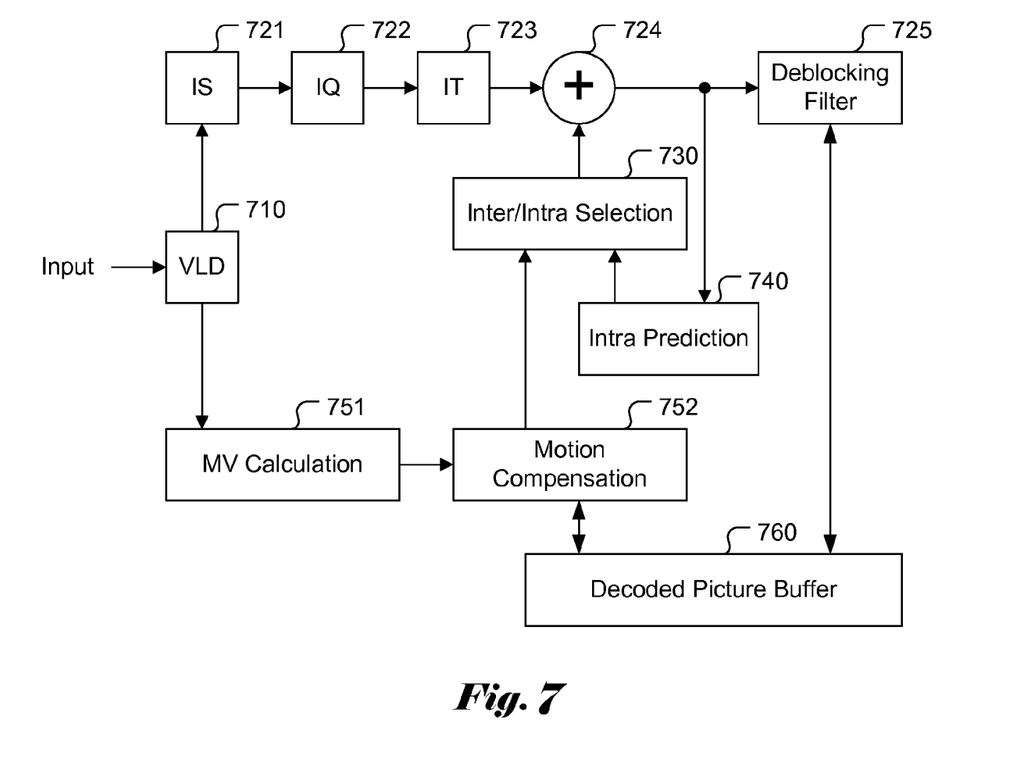
FIG. 7 illustrates an exemplary diagram of video decoding performed in one processing unit according to one embodiment of the present invention.

FIG. 7 illustrates an exemplary decoding flow of each processing core incorporating in-loop filtering to perform the deblocking operation. The coded data of a picture or image is provided to VLD (variable length decoding) 710 for recovering the coded symbols such as residues and other coded information. Then inverse scan (IS) 721, inverse quantization (IQ) 722, inverse transform (IT) 723 are applied in turn to recover the residues. For Intra or Inter reconstruction, the residues are added back to the prediction data obtained from Intra/Inter selection 730. Intra/Inter selection 730 receives Intra prediction data from Intra prediction 740 or receives Inter prediction data from motion compensation 752. Image reconstruction is performed by adding residues to the respective prediction data from Intra prediction 740 or motion compensation 752 using adder 724. The reconstructed data is then processed by deblocking filter 725 across block boundaries to reduce blocking distortion. The filtered results are stored in decoded picture buffer 760 for use of motion compensation by other frames. Deblocking filter 725 is operated as an in-loop filter since the deblocking process is within the reconstruction loop. For Intra prediction, the reconstructed data of the current picture is provided to Intra prediction 740 for the Intra reconstruction of other blocks in the same picture. In order to recover the Inter prediction data, motion information such as motion vector (MV) are parsed from coded bitstream using VLD 710. Motion vector is then determined using MV calculation 751 to determine the motion vector related to the current coding block unit or units. Motion compensation 752 derives the Inter prediction data for the coding block unit or units based on a previously reconstructed picture data stored in decoded picture buffer 760 and the associated motion vector.

According to one embodiment of the present invention, each of the two processing cores filters the block boundaries from the beginning of the corresponding region. One processing unit named as the first processing unit applies the deblocking process to the first block boundaries from the beginning of the first region to the second block boundaries adjacent to the region edge between the first and the second region. Another processing unit named as the second processing unit filters the second block boundaries from the beginning to the end of the second region. According to another embodiment of the present invention, the first processing unit filters only the first block boundaries from the beginning to the end of the first region. The second processing unit performs deblocking only on the second block boundaries from the beginning to the end of the second region. After receiving the filtered result of the first block boundaries adjacent to the region edge between these two regions, the second processing unit applies or re-applies the deblocking filter on the second block boundaries adjacent to the region edge.

Figure 8A:
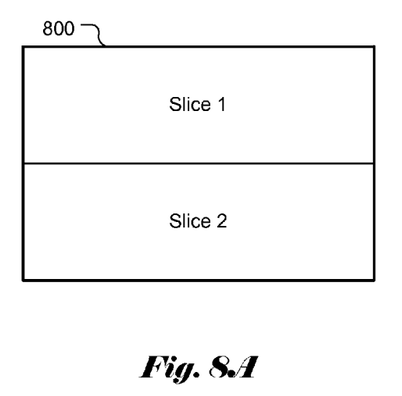
FIG. 8A illustrates an exemplary two-slice image with a straight horizontal boundary.
Figure 8B:
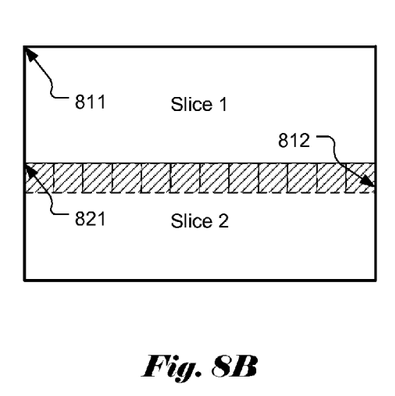
FIG. 8B illustrates an example of deblocking the two-slice image with a straight horizontal boundary using a dual-core decoder.

FIGS. 8A and 8B illustrate an example of filtering a two-region video picture with a dual-core decoder according to an embodiment of the present invention. Video picture 800 consists of two regular regions which are denoted as slice 1 and slice 2, as shown in FIG. 8A. The region edge between slice 1 and slice 2 is a straight-line edge and each slice consists of one or more macroblocks. The beginning of slice 1 is represented by beginning 811 and the beginning of slice 2 is represented by beginning 821. To filter the block boundaries between 4×4 blocks in video picture 800, the first processing core applies deblocking filter to block boundaries from left to right and from top to bottom of slice 1. Similarly, the second processing core applies deblocking filter to block boundaries from left to right and from top to bottom of slice 2. Furthermore, the first processing core continues the deblocking process and applies deblocking filter to block boundaries of one MB row in slice 2 adjacent to the region edge. As shown in FIG. 8B, the deblocking process in the first processing core starts from the beginning location 811 of slice 1 and ends at the end of MB row (indicated by 812) which is one MB row beyond slice 1. The second processing core performs deblocking process only to slice 2 from the beginning location 821 of slice 2 to the end of slice 2. The second processing core initially applies deblocking filter to the MB row (which is marked with the oblique lines) at the top of slice 2 which is adjacent to the region edge and the first processing core re-applies the deblocking process to the MB row at the top of slice 2. As mentioned before, the second processing core may re-apply the deblocking process to the MB row in slice 2 and adjacent to the region edge after the second processing core finishes the deblocking process of slice 2. In this situation, the first processing core applies the deblocking process only to slice 1 and the second processing core applies the deblocking process only to slice 2. The second processing core may re-apply the deblocking process from the beginning location (821) to the ending location (812) after finishing the deblocking process of slice 1.

Figure 9A:
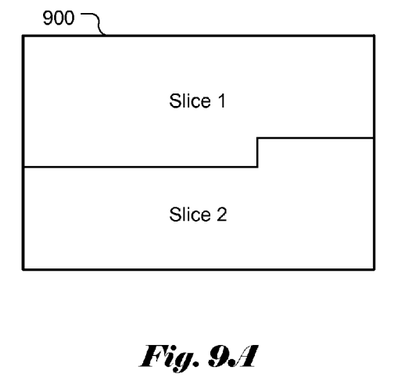
FIG. 9A illustrates an exemplary two-slice image with a non-aligned horizontal boundary.
Figure 9B:
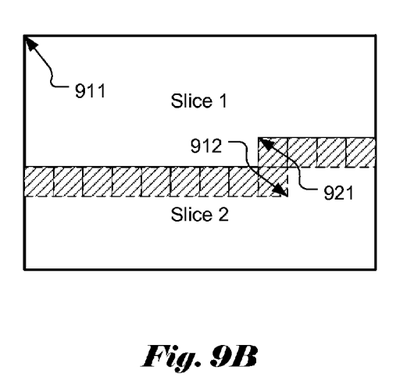
FIG. 9B illustrates an example of deblocking the two-slice image with a non-aligned horizontal boundary using a dual-core decoder.

FIGS. 9A and 9B illustrate another example of deblocking a two-region video picture using a dual-core decoder according to an embodiment of the present invention. Video picture 900 consists of two irregular shape regions which are denoted as slice 1 and slice 2, as shown in FIG. 9A. The beginning of slice 1 is represented by beginning location 911 and the beginning of slice 2 is represented by beginning location 921. Similar to the example shown in FIGS. 8A and 8B, the first processing core applies the deblocking process to the first block boundaries in slice 1 from left to right and from top to bottom of slice 1 and the second processing core applies deblocking filter to block boundaries from left to right and from top to bottom of slice 2. Furthermore, the first processing core continues the deblocking process and applies deblocking filter to block boundaries of one MB row and one additional MB in slice 2 adjacent to the region edge. Since the region edge has an irregular shape, the MB row in slice 2 adjacent to the region edge in this disclosure corresponds to the MBs in slices that are immediately next to the region edge, and the additional MB is immediately next to the last MB in the MB row. The end of the additional MB is shown by ending location 912. Thus, the first processing core applies the deblocking process from beginning location 911 to ending location 912 and the second processing core applies the deblocking process from beginning 921 to the end of slice 2. As mentioned before, the second processing core may re-apply the deblocking process to the MB row and the additional MB in slice 2 adjacent to the region edge after the second processing core finishes the deblocking process of slice 2. In this situation, the first processing core performs the deblocking process only to slice 1 from beginning location 911 to the end of slice 1 and the second processing core performs the deblocking process from beginning 921 to the end of slice 2. The second processing core may re-apply the deblocking process from beginning location 921 to ending location 912 after finishing the deblocking process of slice 1.

In the one embodiment of the present invention, the second block boundaries adjacent to the region edge between the first and the second region are filtered twice.

The second block boundaries, which should be filtered a second time to correct erroneous filtered data due to dummy data at a MB row or a MB column adjacent to the region edge. Therefore, the filter operation on the second region can be re-applied to only one MB row or column adjacent to the region edge.

Figure 10A:
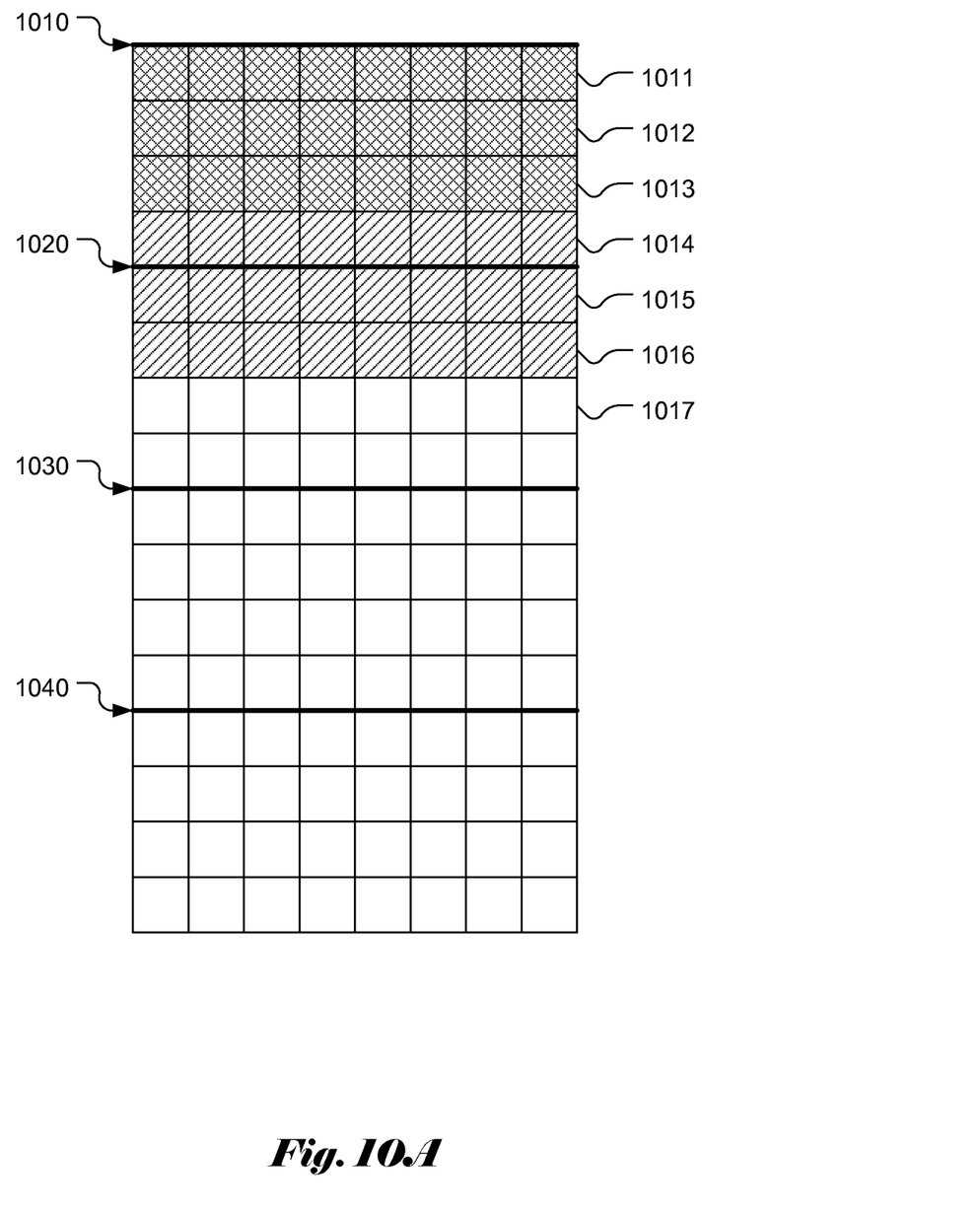
FIG. 10A illustrates an example of filtering process for the first horizontal boundary of the luma component according to one embodiment of the present invention.
Figure 10B:
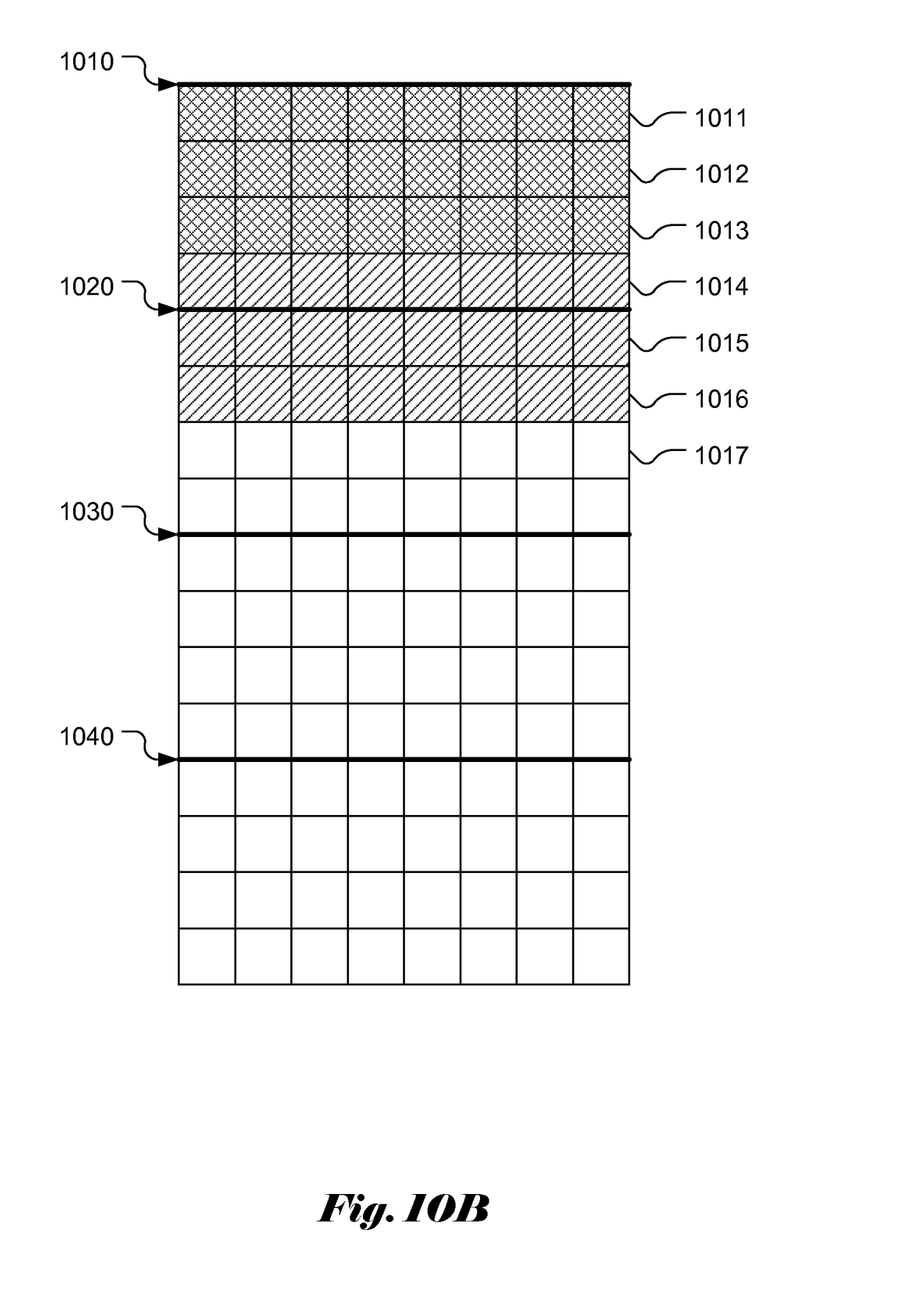
FIG. 10B illustrates an example of filtering the second horizontal boundary of the luma component according to one embodiment of the present invention.
Figure 10C:
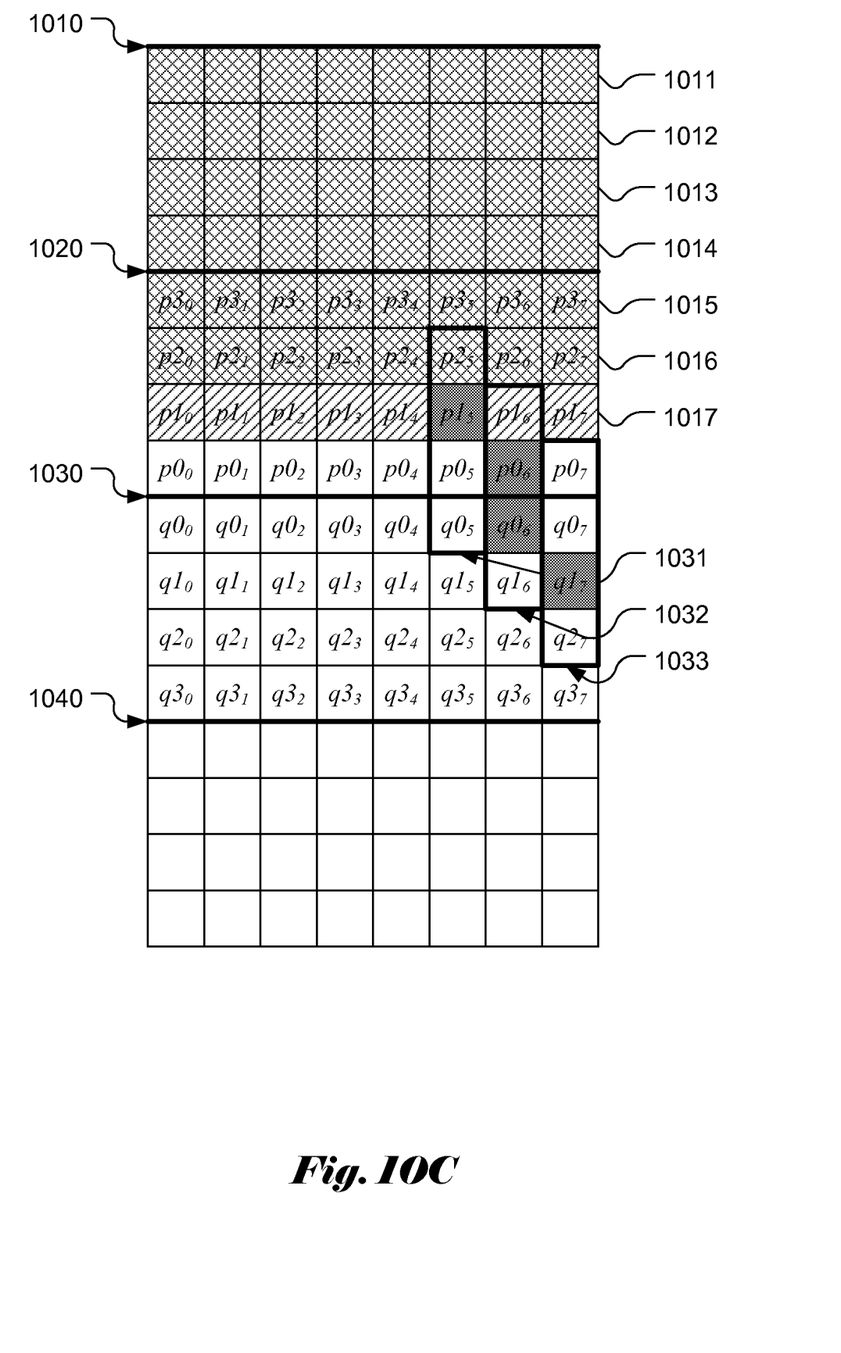
FIG. 10C illustrates an example of filtering the third horizontal boundary of the luma component according to one embodiment of the present invention.

FIGS. 10A to 10C illustrate an example of deblocking filter applied to the second block boundaries of the luma component adjacent to the region edge according to the present invention. This example is used to explain erroneous filtered data adjacent to the region edge due to the use of dummy data. In this example, it is the first time to apply deblocking filter to the second block boundaries adjacent to the region edge between the first region and the second region. Therefore, the deblocking filter is applied to the second block boundaries without receiving the filtered result of the first block boundaries adjacent to the region edge.

FIG. 10A illustrates an example of deblocking filter applied to the horizontal block edge (1010) adjacent to the region edge between the first and the second region. Horizontal block edge 1010 consists of multiple second block boundaries, as shown by edge 1010. Since each horizontal block covers 4 pixels, each horizontal block edge may correspond to multiple horizontal block boundaries. The value of Bs can be determined according to traditional methods, such as the method illustrated with FIG. 5. When processing horizontal block edge (1010), up to 3 pixels (i.e., pixels in pixel lines 1011, 1012 and 1013) adjacent to the region edge may be updated in the second region side. However, since the neighboring samples on the top side of the region edge are not available yet, dummy data is used. Therefore, the deblocking filter applied to the horizontal block edge 1010 may result in at most three erroneous pixel lines (i.e., lines 1011, 1012 and 1013).

FIG. 10B illustrates the scenario of deblocking the second horizontal block edge from the region edge between the first region and the second region. The filter mode of horizontal block edge 1020 is determined based on the boundary strength and the gradient of samples across the edge. Since horizontal block edge 1020 is not a MB boundary, the Bs for filtering horizontal block edge 1020 is no more than 3. Therefore, at most 2 pixels adjacent to the second horizontal block edge may be modified by the deblocking process. Accordingly, the erroneous filtered data may occur up to pixel lines 1015 and 1016 after deblocking the second horizontal edge from the region edge.

FIG. 10C illustrates the scenario of deblocking the third horizontal block edge (1030) from the region edge between the first and the second region. Four pixels on each side of the third horizontal block edge are labeled as (p3, p2, p1, p0, q0, q1, q2, q3). For the third horizontal block edge, Bs for filtering horizontal block edge 1030 is equal to 3 or less since the block boundary is not a MB boundary. The filter strength, Bs for edge 1030 is determined based on p1, p0, q0 and q1. Since there is no erroneous data among p1, p0, q0 and q1, the boundary strength can be correctly determined for the third horizontal block boundaries. However, the filtering of pixel p1 uses four pixels, i.e., p2, p1, q0 and q0 (as indicated by 1031). Since pixel p2 may be erroneous during deblocking the second horizontal block edge, the deblocking process for block boundaries 1030 may result in erroneous filtered p1 (i.e., line 1017). Nevertheless, filtered results for p0 and q0 (as indicated by 1032) and q1 (as indicated by 1033) are all correct. In other words, the erroneous filtered results due to the use of the dummy data in the first region can propagated at most to line 1017. The filter operation applied to fourth horizontal block edge will result in correct results. Thus, the error caused by using dummy data of the first region to filter the second block boundaries of the luma component is propagated to up to 7 pixel lines. In other words, erroneous data caused by the use of dummy data of first region will not affect data in the MB below the MB row adjacent to the region edge. Accordingly, only the MB row in region 2 and adjacent to the region edge needs to be processed by the deblocking filter again. Furthermore, only partial data is affected by the use of dummy data in region 1. Therefore, only the affected data need to be deblocked again.

To filter the second block boundaries of the chroma component, only two pixels are used for modifying each pixel. Since only one pixel may be updated for filtering the second block boundaries of the chroma component, the error for filtering one edge cannot be propagated to another edge. Therefore, at most seven pixel lines from the region edge may be erroneous due to the use of dummy data to filter the region edge in the luma component. To filter the region edge in the chroma component, at most one pixel line may be erroneous as only one pixel line adjacent to the region edge may be updated for deblocking.

The deblocking filter can be re-applied to the second block boundaries within one coding block unit row or column adjacent to the region edge between two regions according to one embodiment of the invention. The coding block unit row or column contains more than seven pixel lines in the luma component or more than one pixel line in chroma component. Thus, possible error introduced by using of dummy data to filter the second block boundaries adjacent to the region edge is corrected.

According to another embodiment of the present invention, the in-loop filter is applied to the second block boundaries adjacent to the region edge after obtaining the deblocked data of the first block boundaries adjacent to the region edge. The deblocking process of the second region is started from the second block boundaries which can be filtered without using dummy data. For example, the second processing unit filters the second boundaries from the eighth pixel line adjacent to the region edge in luma component or from the second pixel line adjacent to the region edge. Therefore, no error is introduced for filtering the second block boundaries adjacent to the region edge.

Using two processing units to filter two regions of the video image is only one embodiment of the present invention. According to the present invention, the decoding system can use a multi-core processor for deblocking the video image or frame. The multi-core processor may comprise more than 2 processing units, such as 3 cores, 4 cores, etc. For example, three processing units can be used for deblocking three regions of the video image when the video image comprises three regions. Each processing unit is individually used for deblocking one corresponding region of the video image. During deblocking block boundaries adjacent to each region edge between two regions, errors may be introduced by using dummy data for deblocking. To prevent the propagation of the errors, the in-loop filter is re-applied to one or more block boundaries which are adjacent to one region edge and may contain errors introduced by using dummy data. The in-loop filter may be re-applied by each processing unit after deblocking the corresponding region.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding a video image using a first processing unit and a second processing unit, wherein the video image comprises a first region and a second region, the method comprising:
    obtaining reconstructed data associated with the video image;
    applying an in-loop filter to first block boundaries associated with first blocks of the reconstructed data in the first region using the first processing unit;
    applying the in-loop filter to second block boundaries associated with second blocks of the reconstructed data in the second region using the second processing unit, wherein the second region is different from the first region, and wherein an applying time of applying the in-loop filter to the first block boundaries and an applying time of applying the in-loop filter to the second block boundaries are independent; and
    re-applying the in-loop filter to one or more second block boundaries adjacent to region edge between the first region and the second region after applying the in-loop filter to the first block boundaries adjacent to the region edge; and
    wherein at least a first portion of said applying the in-loop filter to the first block boundaries and a second portion of said applying the in-loop filter to the second block boundaries are performed concurrently.

2. The method of claim 1, wherein said re-applying the in-loop filter to the second block boundaries adjacent to the region edge is performed using the first processing unit or the second processing unit.

3. The method of claim 1, wherein the first processing unit and the second processing unit correspond to two processing cores within a processor chip.

4. The method of claim 1, wherein the second block boundaries adjacent to the region edge that the in-loop filter is re-applied correspond to the second block boundaries in a second coding block unit row or a second coding block unit column along the region edge, wherein each second coding block unit consists of multiple second blocks horizontally and vertically.

5. The method of claim 1, wherein the in-loop filter requires data samples from two sides of each first block boundary or each second block boundary.

6. The method of claim 1, wherein the first region consists of one or more first slices of the video image, wherein each first slice consists of one or more coding block units.

7. The method of claim 1, wherein the second region consists of one or more second slices of the video image, wherein each second slice consists of one or more coding block units.

8. An apparatus for decoding a video image, wherein the video image comprises a first region and a second region, the apparatus comprising:
    an interface unit to obtain reconstructed data associated with the video image;
    a first processing circuit configured to apply an in-loop filter to first block boundaries associated with first blocks of the reconstructed data in the first region;
    a second processing circuit configured to apply the in-loop filter to second block boundaries associated with second blocks of the reconstructed data in the second region, wherein the second region is different from the first region, and wherein an applying time of applying the in-loop filter to the first block boundaries and an applying time of applying the in-loop filter to the second block boundaries are independent; and
    wherein the first processing circuit or the second processing circuit is further configured to re-applying the in-loop filter to the second block boundaries adjacent to region edge between the first region and the second region, after applying the in-loop filter to one or more first block boundaries adjacent to the region edge, and
    wherein the first processing circuit and the second processing circuit are configured to apply the in-loop filter to a first portion of the first block boundaries and a second portion of the second block boundaries concurrently.

9. The apparatus of claim 8, wherein the first processing circuit and the second processing circuit correspond to two processing cores within a processor chip.

10. The method of claim 1, wherein the first block boundaries comprise boundaries between the first blocks, and wherein the second block boundaries comprise boundaries between the second blocks.

11. The method of claim 1, wherein the first block boundaries comprise vertical and horizontal boundaries between the first blocks, and wherein the second block boundaries comprise vertical and horizontal boundaries between the second blocks.

* * * * *